United States Patent

[11] 3,588,205

| [72] | Inventors | Thomas L. Daugherty<br>Arnold;<br>Gerald J. Philips, Annapolis, Md. |
|---|---|---|
| [21] | Appl. No. | 853,449 |
| [22] | Filed | Aug. 27, 1969 |
| [45] | Patented | June 28, 1971 |
| [73] | Assignee | The United States of America as represented by the Secretary of Navy |

[54] ROLLING CONTACT BEARING DESIGN WHICH REDUCES BEARING GENERATED NOISE AND FRETTING CORROSION
6 Claims, 4 Drawing Figs.

[52] U.S. Cl. .................................................. 308/184
[51] Int. Cl. .................................................. F16c 19/04
[50] Field of Search ........................................... 308/184, 24, 26

[56] References Cited
FOREIGN PATENTS

| 206,530 | 11/1923 | Great Britain ............... | 308/184 |
| 384,384 | 2/1908 | France ....................... | 308/184 |

Primary Examiner—Edgar W. Geoghegan
Assistant Examiner—Frank Susko
Attorneys—L. A. Miller, Q. E. Hodges and A. Sopp ABSTRACT: A bearing having a relief in the outer exterior cylindrical surface circumferentially around the race in the area beneath the rolling element supporting area of the raceway, and having two circumferential grooves which lie on either side of the relieved portion in the race of the bearing.

PATENTED JUN28 1971      3,588,205
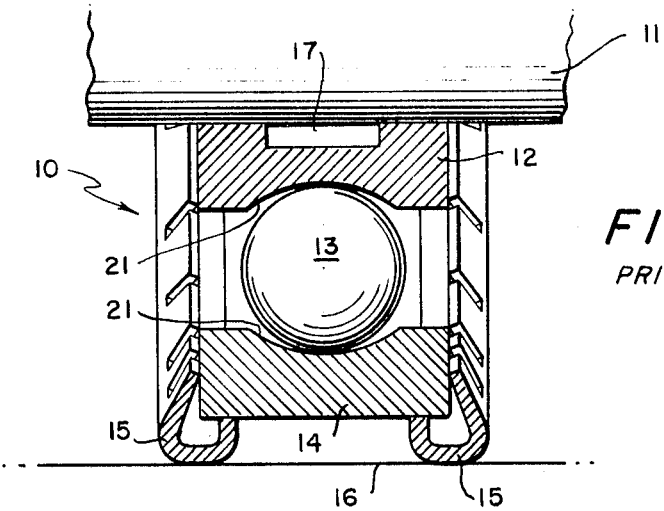
FIG. 1.
PRIOR ART
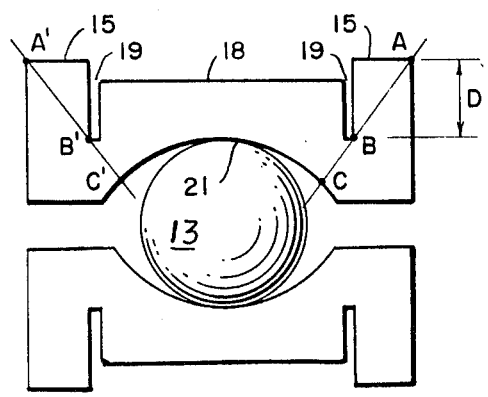
FIG. 2
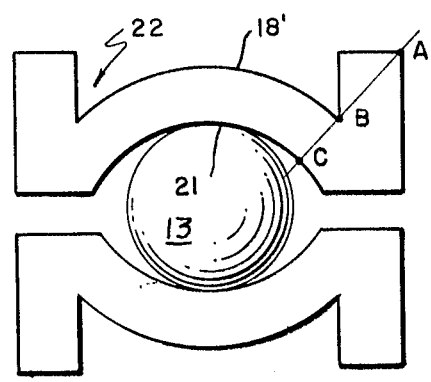
FIG. 3
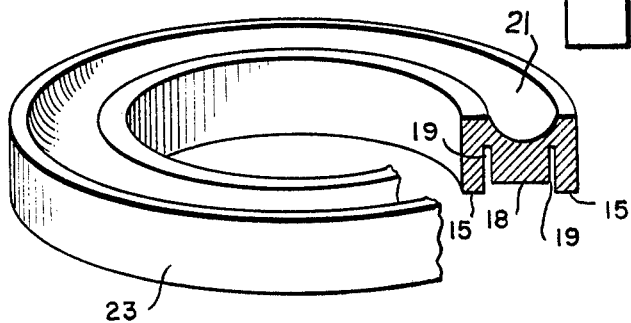
FIG. 4.
INVENTORS
GERALD J. PHILIPS
THOMAS L. DAUGHERTY
BY 
ATTORNEY

ROLLING CONTACT BEARING DESIGN WHICH REDUCES BEARING GENERATED NOISE AND FRETTING CORROSION

The invention invention described herein may be manufactured and used by or for the Government of the United States of America for governmental purposes without the payment of any royalties thereon or therefor.

BACKGROUND AND SUMMARY

In the construction of ball bearings or other bearings having rolling contact elements there has been presented the problem that with the unusual form of outer ring which normally rests solidly against the supporting structure, the local distortions produced in the ring structure by the load factor produces deleterious results on the ring structure. Also the movement of such deformations as the bearing rotates produces noise which is transmitted to the supporting structures. It was also found that as a result of the distortions produced by the rotation of the bearing the outer exterior cylindrical surface of the bearing rapidly become fretted which in turn introduces additional torque requirements to rotate the bearing.

The prior art attempts to overcome these problems have resulted in the construction of a bearing in which the outer race is relieved circumferential to form a shallow groove to provide flexibility of the raceway. This construction appears to reduce the concentration of stress at the point of a contact between the bearing and the rolling member, such as the ball in a ball bearing. Such a construction of a bearing is shown in the patent to Leon, Pat. No. 1,423,950.

The present invention contemplates beginning with a structure such as that disclosed in the patent to Leon and adding to it means for extending the stress path in the element. It is therefore the purpose of this invention to further improve the construction of bearings having rolling contacting elements such as balls or rollers.

It is an object of this invention to provide a structure in which the stress paths or stresses produced in this structure by the pressure of the bodies supported by the bearing are made as long as possible;

It is a further object of the invention to provide means for isolating the noise produced in the bearing from the supporting structure. These and other objects will become more apparent from the accompanying drawings and more detailed description of the invention.

DESCRIPTION OF THE DRAWINGS

FIG. 1 is a FIG. adapted from the patent to Leon to illustrate the state-of-the-art.

FIG. 2 is a diagram of the section through the outer race of a ball bearing showing the grooved construction.

FIG. 3 is a modification of FIG. 2 showing the modification of the grooves in FIG. 2.

FIG. 4 illustrates the invention as applied to the race of a thrust-type bearing. Referring now to the drawings in which a ball bearing is taken to illustrate the invention and wherein like reference characters designate like or corresponding parts throughout the several views, there is shown in FIG. 1 a bearing 10 supporting a shaft 11 on the inner race 12 of the bearing which inner race rides on balls 13. The balls 13 in turn ride in a raceway 21 and are supported by the outer race 14. The outer race 14 has supporting elements or flange members 15 which contact the support 16. It will be noted that in this prior art illustration there is a relieved portion 17 in the inner bearing race and that the flanges 15 cooperate with the outer race 14 to provide the equivalent of a relieved portion of the outer race.

Referring now to FIG. 2 which illustrates only by diagram a section of the outer race of a bearing such as that shown in FIG. 1. This race, as shown in FIG. 2, has a relieved portion 18 and circumferential grooves 19 on either side of the relieved portion. These grooves may be rectangular, as shown in FIG. 2, or may be formed by the straight side of the shoulder 15 and the surface of an arcuately relieved portion 18 as shown at 22 in FIG. 3. The arcuate relieved portion is constructed to have the same center of curvature as the raceway 21. In the construction of these slots the depth of the grooves is determined by a line from the outside point of contact A between the shoulder 15 and the support 16 of the race to the pint C or C' on the inner raceway. This line is shown in FIG. 2 as the lines ABC and A'B'C'. The points C and C' are taken in the raceway to lie outside of the design area of contact of the ball with the raceway, that is to say that the point C and the C' are taken on the arc of the raceway where the arc between these points can be said to define the design maximum operational angle of contact between the raceway and the rolling element, in this instance the ball. When so designed the propagation of the strain from the contact area of the ball to the surface of the bearing support will then be minimized. Such design is particularly effective when the area of contact between the ball and the raceway is offset from the centerline of the bearing.

Referring now to FIG. 3 there is shown a modification of the raceway as shown in FIG. 2. In this modification the weight of the bearing is minimized by constructing the relieved portion of the race with its outer surface defined as a segment of a circular arch with the same center of curvature as the inner raceway of the race. This arch of the outer surface of the race is designed to pass through the points corresponding to the maximum depth of the grooves in FIG. 2, that is through point B which corresponds to the point B on the line ABC in FIG. 2 and where points A and C are defined above. With a construction such as that shown in FIG. 3 the minimum weight for a required bearing strength will be achieved.

In FIG. 4 the race 23 is for a thrust type bearing and the relieved portion, grooves and raceway are subject to the same construction limitations as has been described for FIGS. 2 and 3, except, of course, they lie in the faces of the bearing race rather than in the outer and inner sides of the race respectively, as shown in FIGS. 2 and 3. In addition, the more nearly uniform thickness of the elements of the race reduce the distortion of the bearing under the effects of heating during operation.

In applying this invention to specific designs, the weight of the structure would depend upon the load requirements and, as has been indicated, the invention could be applied to roller bearing as well as ball bearings and to a type of bearing to radially support a shaft or to a thrust-type bearing. It is also contemplated that the grooves of this invention could be applied to either or both races as shown in FIGS. 2 and 3, in either of the types of bearing in which it has been indicated as being usable.

Obviously many modifications and variations of the present invention are possible in the light of the above teachings. It is therefore to be understood that the invention may be practiced otherwise than as specifically described.

We claim:

1. In a resilient antifriction bearing for mounting in a supporting structure having first and second races with raceways therein for retaining rolling elements within said raceways and having an annually relieved portion about at least one of the races on the side of the race opposite the raceway, the unrelieved portion of the race providing supporting shoulders for said race, the improvement comprising at least two grooves in the relieved portion of the race to restrict to a minimum the predetermined strain path from the load bearing portion of the raceway to the supporting structure for the race, said grooves having a depth such that the point of maximum depth lies on a straight line from the points of maximum operation angle of contact between the rolling element and said raceway and the points of contact between said shoulder and the supporting structure exterior to the relieved portion.

2. A bearing as claimed in claim 1 in which said relieved portion constitutes a web between two shoulders wherein said raceway lies in said web and said grooves are formed by constructing the inner and outer surface of said web to have a common center of curvature to thereby provide a bearing of high strength to weight ratio.

3. A bearing as claimed in claim 1, in which said race having the relieved portion is the outer of the races in a radial support bearing.

4. A bearing as claimed in claim 1, having inner and outer races in a radially support bearing in which said inner race and said outer race have relieved and grooved portions.

5. A bearing as claimed in claim 1, in which said raceway and said relieved portion are axially aligned in a race of a thrust-type bearing.

6. A bearing as claimed in claim 5, in which said bearing has two races and each race is relieved opposite the raceway in a thrust-type bearing.